US009723956B2

(12) United States Patent
Arnold, III

(10) Patent No.: US 9,723,956 B2
(45) Date of Patent: Aug. 8, 2017

(54) DEVICE, ARRANGEMENT AND METHOD FOR TEXTURIZING AND AERATING DRINKS

(71) Applicant: Booker & Dax, LLC, New York, NY (US)

(72) Inventor: David E. Arnold, III, New York, NY (US)

(73) Assignee: Booker & Dax, LLC, New York, NY (US)

( * ) Notice: Subject to any disclaimer, the term of this patent is extended or adjusted under 35 U.S.C. 154(b) by 336 days.

(21) Appl. No.: 14/661,353

(22) Filed: Mar. 18, 2015

(65) Prior Publication Data

US 2016/0270599 A1 Sep. 22, 2016

(51) Int. Cl.
*A47J 43/00* (2006.01)
*A47J 43/27* (2006.01)

(52) U.S. Cl.
CPC .................................... *A47J 43/27* (2013.01)

(58) Field of Classification Search
CPC ...................................................... A47J 43/27
See application file for complete search history.

(56) References Cited

U.S. PATENT DOCUMENTS 5,544,960 A * 8/1996 Sommovigo ........... A47J 43/27 366/130
2014/0233344 A1* 8/2014 Aliberti .................. A47J 43/27 366/130
2014/0340979 A1* 11/2014 Keel, III ................ A47J 43/27 366/130

OTHER PUBLICATIONS

Arnold, David, Tales of the Cocktail:Science of Shaking II, Cooking Issues, http://www.cookingissues.com/index.html%3Fp=1527.html, Jul. 24, 2009.
Arnold, David, Cocktail:Science in General Part 1 of 2, Cooking Issues, http://www.cookingissues.com/index.html%3Fp=4585.html, Sep. 2, 2010.

* cited by examiner

*Primary Examiner* — Tony G Soohoo
*Assistant Examiner* — Anshu Bhatia
(74) *Attorney, Agent, or Firm* — Kirschstein, Israel, Schiffmiller & Pieroni, P.C.

(57) ABSTRACT

An arrangement for shaking drinks includes a shaking container and a device placed in a drink in the container. The device texturizes and aerates the drink when the container is shaken. The device has a three-dimensional body constituted of a food-grade, thermally insulating, elastomeric material and is re-usable. The body has a density of about 916 grams per liter, and is dimensioned to almost fully occlude the interior of the container.

14 Claims, 2 Drawing Sheets

32
24
30
26
16
10
28
22

DEVICE, ARRANGEMENT AND METHOD FOR TEXTURIZING AND AERATING DRINKS

FIELD OF THE DISCLOSURE

The present disclosure relates generally to texturizing and aerating drinks, particularly mixed alcoholic drinks that are shaken during their preparation, such as cocktails.

BACKGROUND

Shaken cocktails are made with cocktail shakers to create chilled, enjoyable mixed drinks. The shakers or shaking containers are generally partially filled with ice cubes, together with a mixture of liquid and/or flavoring ingredients at least one of which is an alcohol, and then shaken vigorously before serving. Shaken cocktails have a different texture and taste as compared to stirred cocktails. The texture of a drink can be described, for example, as how bubbly or fizzy, or how viscous (thick or thin), or how foamy or frothy, the drink tastes.

In efforts to aerate and texturize a drink, it was known to add multiple, small objects to cocktail shakers. For example, a multitude of small objects, such as wires, balls of wires, springs made of wire, whisks, or small gauge spheres, e.g., ball bearings, had been placed in drinks inside cocktail shakers, and then shaken. Yet, such efforts proved to be unsatisfactory and ineffective, because the aeration and texture of the shaken drinks were poor. Aside from poor functionality, it was difficult to remove a multitude of small objects from the drink and/or from pieces of crushed ice left over after shaking.

It was also known to skilled practitioners, such as bartenders, that shaking a cocktail with a large-sized ice cube produced a shaken cocktail of superior texture. A standard ice cube measures about 25 mm in each dimension, and the aforementioned large-sized ice cube was about double in size, e.g., and measured about 50 mm in each dimension. Yet, the use of the large-sized ice cube proved to be unsatisfactory in practice, because, among other things, it had to be frozen, used once, and then discarded. Moreover, the large-sized ice cube affected both the temperature and the dilution of the shaken drink, thereby modifying its flavor, balance, strength and aroma.

Accordingly, it would be desirable to avoid using a multitude of small objects or a large-sized ice cube with their above-described drawbacks to texturize and aerate a shaken drink, and to produce a shaken drink of superior texture and aeration.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
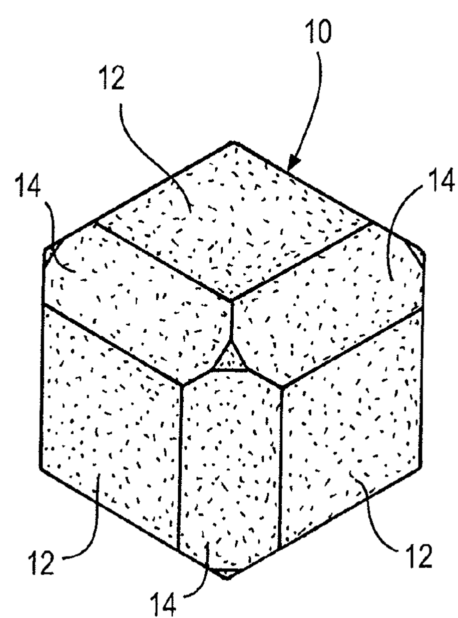
FIG. 1 is a perspective view of a device for texturizing and aerating drinks in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The structural and functional components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one aspect of this invention, a device for texturizing and aerating drinks comprises a three-dimensional body constituted of a food-grade, thermally insulating, elastomeric material. The body is re-usable for texturizing and aerating each drink. The body has a density of about 916 grams per liter, which corresponds to the density of ice. The body has a minimum dimension sized between about 44 mm and 70 mm, and a maximum dimension sized between about 50 mm and 76 mm. In a preferred embodiment, the body is a chamfered, solid cube having square faces and has a rubber hardness durometer of at least Shore 70A. The elastomeric material of the body is preferably a natural or a synthetic rubber.

In accordance with another aspect of this invention, an arrangement for shaking drinks comprises the aforementioned device placed in a drink in the interior of a shaking container having side walls spaced apart by a predetermined dimension. Advantageously, the container is a two-piece shaker and is constituted of a metal or glass material. The body of the device has dimensions that are slightly less than said predetermined dimension to almost fully occlude the interior of the container.

In accordance with still another aspect of this invention, a method of shaking drinks is performed by pouring a drink into a shaking container having side walls that bound an interior and that are spaced apart by a predetermined dimension; configuring a device as a three-dimensional body constituted of a food-grade, thermally insulating, elastomeric material, the body having a density of about 916 grams per liter; placing the device in the drink in the interior of the container, the body having dimensions that are slightly less than said predetermined dimension to almost fully occlude the interior of the container; texturizing and aerating the drink by shaking the container and the device in the liquid; and re-using the device for texturing and aerating another drink.

In all these aspects, the prior art use of a multitude of small objects has been avoided, and it is no longer necessary to remove a multitude of small objects from the drink and/or from pieces of crushed ice left over after shaking. Similarly, the prior art use of a large-sized ice cube has been avoided, and it is no longer necessary to freeze, use once, and then discard any large-sized ice cube or analogous object that deleteriously affects both the temperature and the dilution of the shaken drink. The invention described herein produces a shaken drink of superior texture and aeration, and of a repeatable flavor, balance, strength and aroma.

Turning now to the drawings, reference numeral 10 in FIG. 1 generally identifies a device for texturizing and aerating drinks. As illustrated, the device 10 comprises a three-dimensional body, preferably a chamfered, solid cube having six square faces 12 with each edge 14 beveled. Although a chamfered cube has been illustrated, it will be understood that different shapes, such as spheroids, ovoids, and unchamfered cuboids could also be employed.

The device 10 is constituted of a food-grade material, so that it is safe to use with drinks to be swallowed. The device 10 is constituted of a thermally insulating material, so that it will not adversely affect the temperature of the drink. The device 10 is dishwasher-safe, so that it can be cleaned easily, and be re-used in other drinks indefinitely. The device 10 has a density of about 916 grams per liter, which corresponds to the density of ice. The device 10 is larger than a standard ice cube that typically measures about 25 mm in each dimension. Thus, the device 10 has a minimum dimension sized between each pair of opposed faces of about 44 mm and 70 mm, and a maximum dimension sized between each pair of opposed faces of about 50 mm and 76 mm. The device 10 has a rubber hardness durometer of at least Shore 70A and is constituted of an elastomeric material, preferably a natural or a synthetic rubber.

Figure 2:
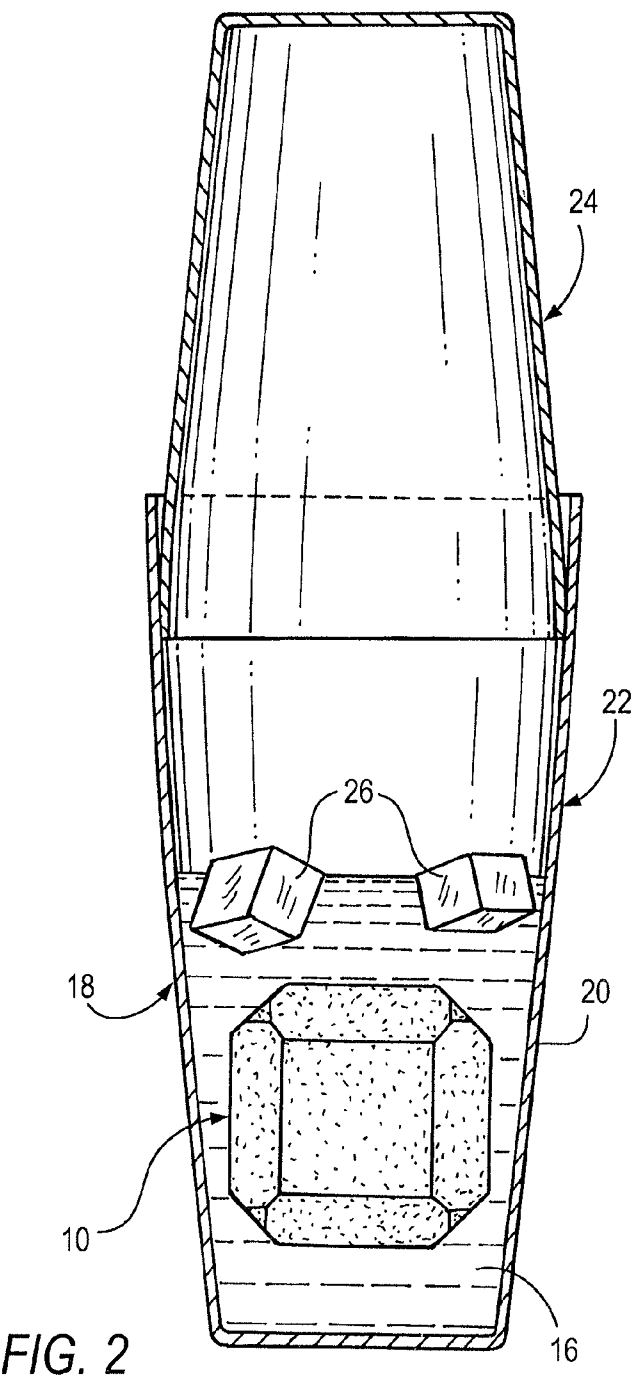
FIG. 2 is a sectional view of an arrangement for shaking drinks that employs the device of FIG. 1.

The device 10 is employed, as described below in connection with FIG. 3, to texturize and aerate a drink 16. As shown in FIG. 2, the device 10 is placed in the interior of a shaking container 18 for containing the drink 16 to be shaken. The container 18 has side walls 20 spaced apart by a predetermined dimension. As shown, the container 18 is a two-piece shaker having a main container part 22 and a top cover part 24 and is typically constituted of a metal or glass material. Standard shaking container sizes include, but are not limited to, 28 ounce shaking metal tins, 18 ounce shaking metal tins, and standard pint glasses. The device 10 has dimensions that are slightly less than said predetermined dimension to almost fully occlude the interior of the container 18. The device 10 fits in a wide variety and size of shaking containers; yet, the device 10 is large enough to almost fully occlude the interior of the container. Since the device 10 has a density that corresponds to the density of ice, the device 10 may float in the drink 16. Standard ice cubes 26 may also be added to the drink for chilling. The container 18 is not entirely full, and an air space overlies the device 10, the ice cubes 26, and the drink 16.

Figure 3:
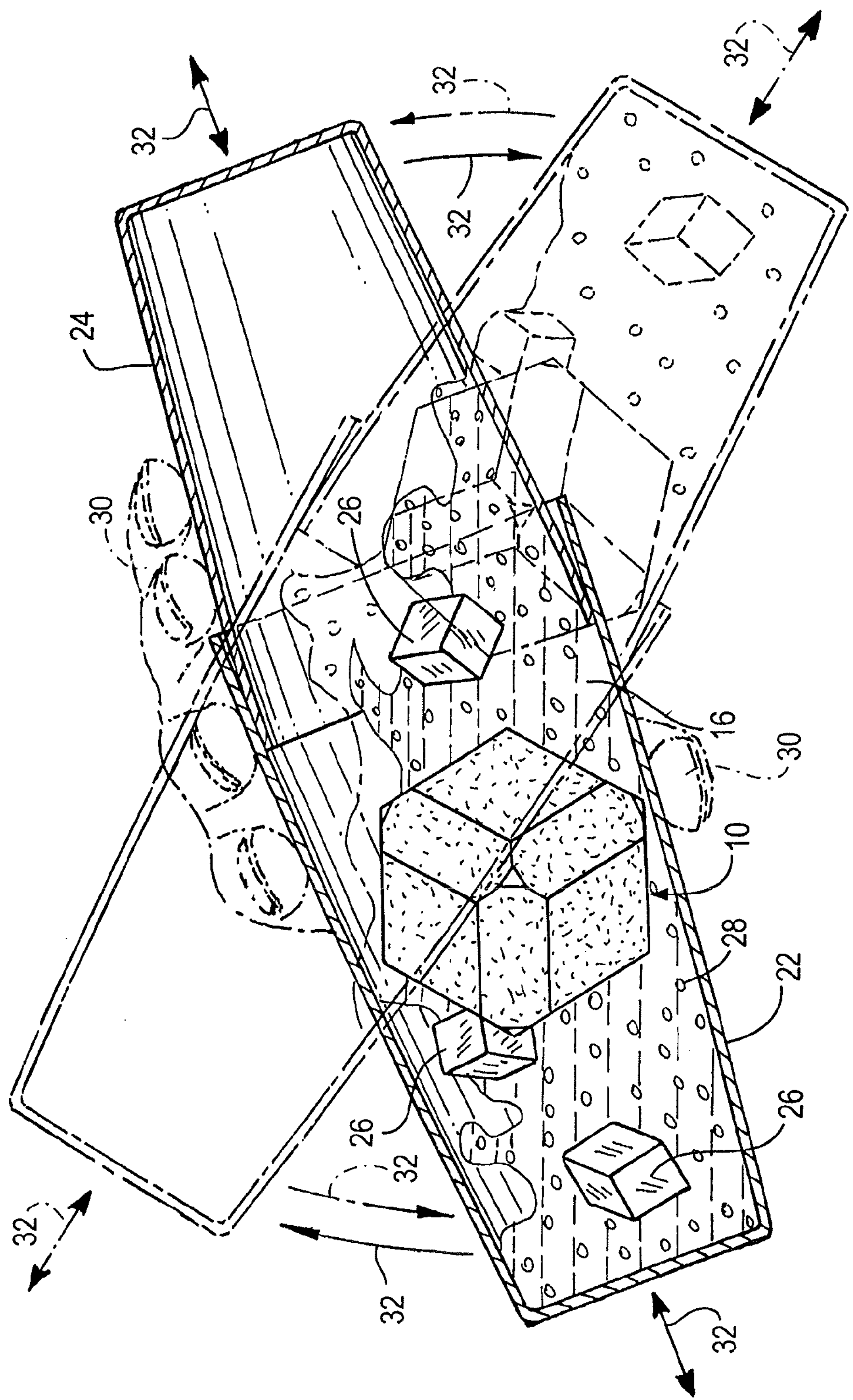
FIG. 3 is a sectional view of the arrangement of FIG. 2 during use.

Turning now to FIG. 3, the container 18 is gripped, either near its center by one hand 30 as shown, or by both hands, or is gripped at both ends by both hands, of a bartender or other practitioner, and then shaken vigorously in the directions of the arrows 32 for about 12-15 seconds, at which time the drink 16 has reached an equilibrium. During this shaking, the container 18 is moved back-and-forth generally lengthwise of the container 18 and/or the container 18 is pivoted by flexing one's wrist(s). The device 10 participates in this movement and moves in opposite directions into and out of the drink 16 and the overhead air space, and thereby aerates and texturizes the drink 16. The partial occlusion of the container 18 as the drink 16 rushes past the device 10 accelerates the drink 16 to provide aeration and texture, as represented by the air bubbles 28 in the drink 16. Since the density of the device 10 is close to that of ice, the skilled practitioner, who is accustomed to the feel of a large-sized ice cube to produce aeration, is comfortable in using the device 10. A denser device will not move through the drink 16 properly, will not provide good texture, and can cause fatigue in the practitioner, who feels that there is something wrong during the shaking.

As previously mentioned, the material of the device 10 is elastomeric to assist in preventing small fragments of the device from flaking off and spoiling the finished shaken drink, as well as in preventing the container 18 from being dented or broken during shaking. However, if the elastomeric compound used for the device is too soft, then it feels unpleasant in the container, and no practitioner will want to use the arrangement. The harder the device 10 is without being so rigid as to produce flakes, the more that the device 10 feels like natural ice in the container.

As also previously mentioned, the material of the device 10 has a low thermal mass and is a good insulator in order to have a minimal impact on the amount of ice melted during the shaking process. If the device 10 were made of a thermally conductive material, such as a metal, or one that stored a great amount of thermal energy, then the balance of the drink 16 would be thrown off.

Although the invention has been described in connection with the making of cocktails, it will be understood that it is not intended to be so limited, because other drinks could benefit from this invention. Thus, non-alcoholic and/or non-mixed drinks, such as water or juice, or other beverages, such as wine, could be aerated by shaking.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A device for texturizing and aerating drinks, comprising:

a three-dimensional body constituted of a food-grade, thermally insulating, elastomeric material and being re-usable for texturizing and aerating each drink, the body having a density of about 916 grams per liter, and the body having a minimum dimension sized between about 44 mm and 70 mm, and a maximum dimension sized between about 50 mm and 76 mm.

2. The device of claim 1, wherein the body is a chamfered, solid cube having square faces.

3. The device of claim 1, wherein the body has a rubber hardness durometer of at least Shore 70A.

4. The device of claim 1, wherein the elastomeric material of the body is selected from one of natural and synthetic rubbers.

5. An arrangement for shaking drinks, comprising:

a shaking container for containing a drink, the container having side walls bounding an interior and spaced apart by a predetermined dimension; and a device placed in the interior of the container for texturizing and aerating the drink when the container is shaken, the device including a three-dimensional body constituted of a food-grade, thermally insulating, elastomeric material and being re-usable for texturizing and aerating each drink, the body having a density of about 916 grams per liter, the body having dimensions that are slightly less than said predetermined dimension to almost fully occlude the interior of the container wherein the body has a minimum dimension sized between about 44 mm and 70 mm, and a maximum dimension sized between about 50 mm and 76 mm.

6. The arrangement of claim 5, wherein the body is a chamfered, solid cube having square faces.

7. The arrangement of claim 5, wherein the body has a rubber hardness durometer of at least Shore 70A.

8. The arrangement of claim 5, wherein the elastomeric material of the body is selected from one of natural and synthetic rubbers.

9. The arrangement of claim 5, wherein the container is a two-piece shaker and is constituted of one of metal and glass materials.

10. A method of shaking drinks, comprising:

pouring a drink into a shaking container having side walls that bound an interior and that are spaced apart by a predetermined dimension;

configuring a device as a three-dimensional body constituted of a food-grade, thermally insulating, elastomeric material, the body having a density of about 916 grams per liter;

placing the device in the drink in the interior of the container, the body having dimensions that are slightly less than said predetermined dimension to almost fully occlude the interior of the container;

texturizing and aerating the drink by shaking the container and the device in the drink; and re-using the device for texturing and aerating another drink and sizing the body with a minimum dimension between about 44 mm and 70 mm, and a maximum dimension between about 50 mm and 76 mm.

11. The method of claim 10, and shaping the body as a chamfered, solid cube having square faces.

12. The method of claim 10, and configuring the body to have a rubber hardness durometer of at least Shore 70A.

13. The method of claim 10, and selecting the elastomeric material of the body from one of natural and synthetic rubbers.

14. The method of claim 10, and configuring the container as a two-piece shaker that is constituted of one of metal and glass materials.

* * * * *